United States Patent [19]
Gelles

[11] Patent Number: 5,212,220
[45] Date of Patent: May 18, 1993

[54] WATER-BASED EMULSIONS AND DISPERSIONS OF BITUMEN MODIFIED WITH A FUNCTIONALIZED BLOCK COPOLYMER

[75] Inventor: Richard Gelles, Sugarland, Tex.

[73] Assignee: Shell Oil Company, Houston, Tex.

[21] Appl. No.: 853,645

[22] Filed: Mar. 18, 1992

[51] Int. Cl.$^5$ .............................................. C08L 95/00
[52] U.S. Cl. ....................................... 524/68; 524/60; 524/69
[58] Field of Search .............................. 524/60, 68, 69

[56] References Cited

U.S. PATENT DOCUMENTS

| | | | |
|---|---|---|---|
| 4,145,322 | 3/1979 | Maldonado et al. | 428/489 |
| 4,330,449 | 5/1982 | Maldonado et al. | 529/68 |
| 4,387,172 | 6/1983 | Agarwal et al. | 524/60 |
| 4,544,690 | 10/1985 | Ladish | 524/60 |
| 4,731,399 | 3/1988 | Fitzgerald et al. | 524/60 |
| 4,772,648 | 9/1988 | Demangeon et al. | 524/60 |
| 4,812,327 | 3/1989 | Hanazawa et al. | 524/60 |
| 4,879,326 | 11/1989 | Demangeon et al. | 524/60 |
| 4,997,868 | 3/1991 | Blanpain et al. | 24/60 |
| 5,066,694 | 11/1991 | Agarwal et al. | 524/60 |
| 5,087,652 | 2/1992 | Christell | 524/60 |

FOREIGN PATENT DOCUMENTS

| | | | |
|---|---|---|---|
| 1815026 | 10/1970 | Fed. Rep. of Germany | 524/60 |
| 3911717 | 11/1989 | Fed. Rep. of Germany | 524/60 |
| 0221461 | 4/1985 | German Democratic Rep. | 524/60 |
| 0280331 | 7/1990 | German Democratic Rep. | 524/60 |
| 58-80318 | 5/1983 | Japan | 524/60 |

*Primary Examiner*—Paul R. Michl
*Assistant Examiner*—Peter Szekely
*Attorney, Agent, or Firm*—Donald F. Haas

[57] ABSTRACT

A bitumen emulsion comprising (a) bitumen, (b) water, (c) optionally at least one emulsifier, and (d) a conjugated diene block copolymer containing functional groups which have a strong affinity for water. A bituminous composition comprising (a) bitumen, and (b) a polymer emulsion comprising (i) water, (ii) optionally at least one emulsifier, and (iii) a conjugated diene block copolymer containing functional groups which have a strong affinity for water.

12 Claims, No Drawings

WATER-BASED EMULSIONS AND DISPERSIONS OF BITUMEN MODIFIED WITH A FUNCTIONALIZED BLOCK COPOLYMER

BACKGROUND OF THE INVENTION

This invention relates to emulsions and dispersions of bitumen modified with functionalized block copolymers. More particularly, it relates to such emulsions and dispersions containing acrylic monomer-containing block copolymers or maleic anhydride functionalized block copolymers.

Asphalt is a common material utilized for the preparation of paving and roofing materials and also for coatings such as pipe coatings and tank liners. While the material is suitable in many respects, it inherently is deficient in some physical properties which it would be highly desirable to improve. Diene polymer rubbers such as styrene-butadiene rubber and styrene-rubber block copolymers such as styrene-butadiene-styrene and styrene-isoprene-styrene block copolymers have been used to dramatically improve the thermal and mechanical properties of asphalts.

Bitumen emulsions and dispersions have been known for some time. They are heterogeneous 2-phase systems consisting of 2 immiscible materials, bitumen and water. The bitumen is dispersed throughout the continuous water phase in the form of discreet globules which are held in suspension by an emulsifier. Such bitumen emulsions and dispersions have a wide variety of uses such as in road construction, horticultural and agricultural applications, slip coats for concrete, protective coats for concrete, pipelines and ironwork and also for sealing cracks and grouting.

Bitumen emulsions and dispersions containing the polymers discussed above are known. Such emulsions and dispersions have the advantage that such polymers ordinarily give to the bitumen alone. However, such emulsions and dispersions have the following disadvantages: they are not sufficiently stable, they may coalesce, irreversibly flocculate or settle or cream, the coalesced bitumen phase has poor properties after water drying and they are difficult to prepare at high polymer loading. These disadvantages are most likely caused by the lack of affinity that the nonpolar polymers have for water.

It is also known to make emulsions and dispersions of the polymers discussed above in water with a surfactant and then add the polymer emulsions and dispersions to bitumen to obtain improved properties. Addition of a polymer emulsion or dispersion to bitumen provides a means of mixing polymer and bitumen which does not require special high shear high temperature mixing equipment. It does not put the polymer and bitumen through an unnecessary heating step. However, when this process is used, it is often difficult to prepare polymer emulsions and dispersions which are stable or ones with very small dispersed polymer particles. This is because of the lack of affinity of these block copolymers for water. A small dispersed polymer particle improves mixing of polymer and bitumen.

Therefore, there is a need for bitumen emulsions and dispersions and bitumen compositions containing polymer emulsions and dispersions which contain polymers which have a strong affinity for water. The present invention provides such emulsions and dispersions and compositions.

SUMMARY OF THE INVENTION

This invention relates to improved bitumen-polymer emulsions and dispersions. The emulsions and dispersions comprise bitumen, water, optionally at least one emulsifier and a polymer containing functional groups which have a strong affinity for water. An emulsion is the 2-phase system described above with a dispersed liquid phase. A dispersion is a 2-phase system with a solid dispersed phase In the following description and claims, the term emulsion is meant to encompass both types of systems In a preferred embodiment of the invention, the polymer is a block copolymer which comprises at least one conjugated diolefin block and at least one acrylic monomer block, said acrylic monomer block providing the functional groups which have a strong affinity for water. In another preferred embodiment of the invention, the polymer is a block copolymer which contains at least one conjugated diolefin block and at least one vinyl aromatic hydrocarbon block and the functionality is provided by grafting carboxylic acid groups or their anhydrides onto the diene block of the polymer.

The present invention also relates to bituminous compositions which comprise bitumen and polymer emulsions. The polymer emulsions comprise water, optionally at least one emulsifier and a polymer containing functional groups which have a strong affinity for water. In a preferred embodiment of the invention, the polymer is a block copolymer which comprises at least one conjugated diolefin block and at least one acrylic monomer block, said acrylic monomer block providing the functional groups which have a strong affinity for water. In another preferred embodiment of the invention, the polymer is a block copolymer which contains at least one conjugated diolefin block and at least one vinyl aromatic hydrocarbon block and the functionality is provided by grafting carboxylic acid groups or their anhydrides onto the diene block of the polymer.

DETAILED DESCRIPTION OF THE INVENTION

The bituminous component in the bituminous-polymer compositions according to the present invention may be a naturally occurring bitumen or derived from a mineral oil. Also, petroleum derivatives obtained by a cracking process, pitch and coal tar can be used as the bituminous component as well as blends of various bituminous materials. Any asphalt may be used.

Examples of suitable components include distillation or "straight-run bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues, or with oils.

As is well known, polymers containing both aromatic and ethylenic unsaturation can be prepared by copolymerizing one or more polyolefins, particularly a diolefin, in this case butadiene and isoprene, with one or more alkenyl aromatic hydrocarbon monomers, in this case styrene. Other diolefins such as 2,3-dimethyl-1:3-butadiene, 1,3-pentadiene, 1,3-hexadiene and the like, and other vinyl aromatic hydrocarbons such as o-methylstyrene, p-methylstyrene,p-tertbutylstyrene,1,3-dimethylstyrene,alphamethylstyrene, vinylnaphthalene, vinylanthracene and the like may be used. The copolymers may, of course, be random, tapered, block or a combination of these. The copolymers may have radial or star configurations as well.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as ABA block copolymers are frequently prepared in solution using anionic polymerization techniques. In general, when solution anionic techniques are used, these polymers are prepared by contacting the monomers to be polymerized simultaneously or sequentially with an organoalkali metal compound in a suitable solvent at a temperature within the range from about 150° C. to about 300° C., preferably at a temperature within the range from about 0° C. to about 100° C. Particularly effective anionic polymerization initiators are organolithium compounds having the general formula:

$$RLi_n$$

Wherein:

R is an aliphatic, cycloaliphatic, aromatic or alkyl-substituted aromatic hydrocarbon radical having from 1 to about 20 carbon atoms., and n is an integer of 1 to 4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; halogenated hydrocarbons, particularly halogenated aromatic hydrocarbons, such as chlorobenzene, chlorotoluene and the like; linear and cyclic ethers such as methyl ether, methyl ethyl ether, tetrahydrofuran and the like; ketones such as methyl ketone (acetone), methyl ethyl ketone, ethyl ketone (e-pentanone) and the like.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905, 3,390,207, 3,598,887 and 4,219,627 which are herein incorporated by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the appropriation of multiblock copolymers containing tapered copolymer blocks including U.S. Pat. Nos. 3,251,905, 3,265,765, 3,639,521 and 4,208,356 which are herein incorporated by reference. If desired, these block copolymers can be hydrogenated. Hydrogenation may be effected selectively as disclosed in U.S. Pat. Nos. Reissue 27,145 and 5,039,755 which are herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts. The residual unsaturation should be less than 20%, preferably as close to zero as possible.

The preferred polymers which may be used according to the present invention are polymers of conjugated dienes and acrylic monomers of the formula described above such as alkyl methacrylates or derivatives of alkyl methacrylates such as hydrolyzed alkyl methacrylates or anhydride derivatives thereof. Other suitable acrylic monomers include acrylates, such as t-butyl acrylate; cyclic alkyl methacrylates, such as 2,6-dimethylcyclohexyl methacrylate; and acrylates in which the alkyl group contains an ether linkage, such as tetrahydrofuran acrylate. Copolymers containing two or more conjugated dienes are useful herein. Copolymers of conjugated dienes and acrylic monomers with vinyl aromatic monomers are preferred and both random and block copolymers thereof are useful herein. The description which follows is described in terms of block copolymers of conjugated dienes, alkyl methacrylates and vinyl aromatic hydrocarbons but it is applicable also to the other polymers described in this paragraph. This means that this invention encompasses functionalized polymers which are not block copolymers but which incorporate the functionality as described below.

These polymers are block polymers of at least one conjugated diene and at least one acrylic monomer with the structure:

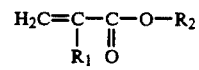

where $R_1$ is hydrogen, phenyl or an alkyl radical which is linear or branched and has from 1 to 10 carbon atoms and $R_2$ is an alkyl radical which is branched at the first carbon atom, has from 1 to 14 carbon atoms, may contain a tertiary amine or an ether linkage and may be a cyclic hydrocarbon. These polymers are functionalized in that they contain, in the polymer backbone, acrylic, especially methacrylate, functionality. This provides the polymer with strongly reactive and interactive chemical groups. In the formula above, it is important that $R_2$ be branched at the first carbon because branching makes the monomer easier to polymerize.

The present invention encompasses polymers which are both high and low in molecular weight, as well as in between. High molecular weight polymers include those up to several million molecular weight as defined by gel permeation chromatography (GPC) peak molecular weight of the main species. Low molecular weight polymers include those of only 1000 molecular weight or even less. In all cases these polymers contain both conjugated dienes and acrylic monomers (alkyl methacrylates).

The preferred base polymers of the present invention are block copolymers of conjugated dienes, acrylic monomers such as alkyl methacrylates or their derivatives and vinyl aromatic hydrocarbons. Such block copolymers may be multiblock copolymers of varying structures containing various ratios of the monomers including those containing up to about 60% by weight of vinyl aromatic hydrocarbon. At higher vinyl aromatic hydrocarbon contents, the polymers are not very compatible with bitumens. Thus, multiblock copolymers may be utilized which are linear or radial, symmetric or asymmetric, and which have structures represented by the formulae, ABAC, ABC, BC, BAC, CABAC, CBC, $(BC)_nX$, $(CB)_nX$, $(BC)_nXA_m$, $(CB)_nXA_m$, $(BC)_nXB_m$, $(CB)_nXB_m$, etc. where A is the vinyl aromatic hydrocarbon, B is the diene, C is the acrylic monomer, X is a coupling agent and n and m are integers from 1 to 50. These are just some of the structures possible. Their finite number is not meant to limit the scope of the invention. It is not necessary but B can be a polymer block of a conjugated diene that has been hydrogenated.

It may be desirable to acid functionalize these block copolymers of methacrylate and rubber. However, the routes to acid functionalizing involve exposing the polymer to: (1) heat which eliminates isobutylene to form methacrylic acid, or (2), hydrolysis of the ester group by heating (70–90° C.) a polymer solution in the presence of an acid or acid catalyst. Both routes can degrade and/or crosslink unsaturated rubber. To circumvent this problem the rubber block may be hydrogenated. An alternate route to acid functionalization of styrene-rubber copolymers is possible by sequentially polymerizing a segment of polymethacrylate onto one end of the styrene-rubber to make an "ABC" type polymer. The acid functionality can then be made in situ during the acid wash stage of catalyst removal.

The preferred polymers for use herein are block copolymers which contain a block of conjugated diene and a block of alkyl methacrylate because such polymers have a portion which is compatible with asphalt and another portion which is compatible with water. By compatible it is meant that a portion shows a strong affinity for, attraction to or solubility with the asphalt or water.

These acrylic monomer containing block copolymers may be produced by any well known block polymerization or copolymerization procedures including the well-known sequential addition of monomer techniques, incremental addition of monomer technique or coupling technique. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. The manufacture of such polymers containing alkyl methacrylates is described in U.S. Pat. No. 5,002,676 and copending commonly assigned application Ser. No. 525,812, filed May 21, 1990, both of which are herein incorporated by reference.

Alkyl methacrylates are preferred for use herein and those employed herein include methacrylates wherein the alkyl group has up to 14 carbon atoms inclusive. Derivatives of these polymers are also included herein, such as, for example, polymers with partially or completely acidified methacrylate groups, their anhydrides, their ionomers, their reaction products with alcohols and amines, and the like. Derivatives of alkyl methacrylates include methacrylic acid, methacrylic acid salts (for example, zinc, sodium and quaternary ammonium salts) and anhydrides formed between adjacent and non-adjacent acid units by heating. It should be noted that derivatization of the methacrylate group can be carried out prior to adding the polymer to bitumen or water, or in situ after the polymer is added to bitumen or water. The in situ reaction requires a reactive ester group such as t-butyl or 1,1-dimethyl alkyl ester. Catalysts such as acids and bases can be added to aid the in situ conversion in asphalt or water. Illustrative of such methacrylate esters are methyl methacrylate, ethyl methacrylate, sec-butyl methacrylate, t-butyl methacrylate, i-amyl methacrylate, hexyl methacrylate, decyl methacrylate and dodecyl methacrylate. Largely because of ease of polymerization, the preferred alkyl methacrylates are branched-butyl methacrylates, i.e., iso-butyl methacrylate and t-butyl methacrylate. The desired poly(alkyl methacrylate) block is produced by directly polymerizing the corresponding alkyl methacrylate monomer or alternatively the desired block is obtained by polymerizing a more easily polymerizable methacrylate and subsequently transesterifying the product to introduce the desired alkyl group. It is also possible to copolymerize either randomly or sequentially two or more acrylic monomers to form the desired block. Tertiary butyl methacrylate (TBMA) is the preferred acrylic monomer because of ease of purification and polymerization, and because it undergoes thermolysis at temperatures as low as about 180° C.

The amount of acrylic monomer in the preferred polymers of the present invention may be as little as 0.1% and the advantages of the present invention will still be achieved. The amount of acrylic monomer in the polymer may range all the way up to 80% or even as high as 99% but the high cost of the acrylic monomer may, in commercial practice, dictate that lower levels should be used. It is preferred that from 0.5% to 50% be used in the polymer because of cost and because the polymer must have sufficient amounts of water attracting and asphalt attracting portions. It is noted that a water soluble polymer could be prepared at very high acrylic monomer contents (greater than 50%) and through derivatization, and that the emulsions and compositions of the present invention ca be prepared with such polymers using them as polymeric surfactants. The molecular weight of these polymers may range from 1,000 to 1,000,000, preferably 4,000 to 1,000,000 because low molecular weight anionically produced polymers are expensive. The molecular weight of the acrylic monomer block may range all the way up to 300,000. Lower molecular weight acrylic monomers blocks are advantageous at the present time from a cost standpoint.

The specific structure of the acrylic monomer-containing polymer of interest depends upon the application of interest. For example, ionomers, (partially or completely neutralized), i.e. salt forms of acidified TBMA-containing polymers will give greater water solubility than acidified analogs which, in turn, will give greater water solubility than their alkyl esters.

Polymers which greatly enhance the flow resistance of asphalt in addition to improving properties associated with the acrylic monomer group may be utilized. These polymers should have two or more vinyl aromatic hydrocarbon blocks, i.e. polystyrene blocks. These polymers should have a vinyl aromatic hydrocarbon content of less than about 60% so that they are compatible with asphalt and greater than about 10% so that they will provide flow resistance at reasonable molecular weight. They should have molecular weights greater than about 30,000 so that they improve flow resistance at low use levels and less than about 1,000,000 so that they are compatible and readily mixable with asphalt. The 1,000,000 molecular weight limit refers to linear structures. Radial or star polymer with from three to about fifty arms are also envisioned. Their uncoupled precursor should have a molecular weight below about 500,000. After coupling, they could have a molecular weight of up to 50 times 500,000, or 25,000,000.

The above described acrylic monomer polymers provide functional groups which have strong affinity for water to the polymers. Of course, it is the acrylic monomers themselves which are the functional groups. The functional groups which have a strong affinity for water may also be provided by incorporating acids or anhydrides or derivatives thereof into a block copolymer of a conjugated diene and a vinyl aromatic hydrocarbon by grafting such groups onto the polymer. In this case, it is preferred that the functional groups by grafted onto the diene block of the polymer.

The acid functionalized block copolymers of the present invention are hydrogenated and unhydrogenated block copolymers as described above which have been reacted with various acid functional group-containing molecules. The acid functional group containing molecules which may be reacted with such block copolymers to produce a functionalized block copolymer useful in the present invention include acid or anhydride groups or derivatives thereof. Functionalized polymers containing carboxyl groups reacted onto the vinyl aromatic hydrocarbon block are described in U.S. Pat. No. 4,868,245 which is herein incorporated by reference. The preferred acid monomers for functionalizing the polymers of the present invention are those which can be grafted onto the diene block of the polymer in free radical initiated reactions. Such preferred monomers include acids or anhydrides or derivatives thereof such as carboxylic acid groups and their salts, anhydrides, esters, imide groups, amide groups, acid chlorides and the like. Such monomers and functionalized polymers incorporating them are described in U.S. Pat. No. 4,578,429 which is herein incorporated by reference. The preferred modifying monomers are unsaturated mono- and polycarboxylic-containing acids and anhydrides and other derivatives thereof. Examples of such monomers include maleic acid, maleic anhydride, fumaric acid and the other materials mentioned in the above-referenced patent. Sulfonic acid functionalized polymers, such as described in U.S. Pat. No. 4,086,171 which is herein incorporated by reference, may also be used. The functionalized block copolymers can be subsequently reacted with other modifying materials to produce new functionalized polymers which work in the present invention. For example, the reaction products of an anhydride functionalized polymer with ammonia or a dialkylamino propylamine are an imide and tertiary amine functional polymer respectively.

The acid functionalized block copolymers utilized should contain from at least about 0.1% of the functional groups because this ensures the desired improvement is obtained. Preferably, from about 0.5% to about 30% of the functional groups should be present in the polymer. It is difficult to prepare acid functionalized polymers by this method with higher levels of functional groups.

Bitumen Emulsions

The bitumen emulsions of the present invention can be manufactured using any of the well known methods used for manufacturing prior art bitumen emulsions. Many bitumen emulsions are manufactured commercially using colloidal mills in a continuous process. The bitumen is heated and blended with the polymer containing the functional groups by mixing in high or low shear mechanical mixers. The type of mixer required depends on the bitumen and polymer chosen. If it is to be used, a solution of the emulsifier in water is prepared. If an emulsifier is not used, water is used rather than the emulsifier solution. The method of adding the emulsifier to the water varies. Some emulsifiers, such as amines, must be mixed and reacted with an acid, e.g. hydrochloric acid, to attain water solubility, whereas others, such as fatty acids, must be mixed and reacted with an alkali, e.g. sodium hydroxide, to attain water solubility.

The hot bitumen and optional emulsifier solution (or water) are mixed together, e.g. by being fed in separately but simultaneously into a colloid mill. The temperatures of the two components will vary depending upon the grade and percentage of bitumen in the emulsion, the type of emulsifier, etc. Generally, bitumen temperatures in the range of 100° C. to 140° C. are used. It can be desirable with bitumen containing very high levels of polymer to use higher temperatures, up to 250° C. The temperature of the water phase is adjusted so that the temperature of the emulsion produced is usually not greater than 100° C. It can be desirable to use pressurized mills and heat exchangers when very high (>140° C.) bitumen temperatures are used. The two phases are mixed together, e.g. in the colloid mill they are subjected to intense shearing forces which cause the bitumen to break into small globules. The individual globules are then coated with the emulsifier which gives the surface of the droplets an electrical charge (in the case of anionic or cationic emulsifiers) and the resulting electrostatic forces prevent the globules from coalescing. Excess water may be removed from the emulsion by heating. Solvents and oils may be added to the bitumen to reduce viscosity prior to emulsification. Solvents can also be removed by heating. The presence of the block copolymer with functional groups which possess a strong attraction for water significantly enhances the ease of preparing these emulsions.

Generally, the bitumen emulsions of the present invention contain 5% to 90% of dispersed phase, i.e. the bitumen plus polymer (plus other additives), and 10 to 95% of water phase, i.e. the water plus surfactant. It is preferred that greater than 30% dispersed phase be used so that films prepared from the emulsion lose water easily via evaporation, and also to reduce shipping costs of the emulsion.

The dispersed phase of the emulsion generally will contain 80% to 99.995% bitumen and 0.005% to 20% of the polymer based on a total of 100% of bitumen plus polymer. If other components are added to the dispersed phase composition prior to emulsification, for example other block copolymers, then the above concentration limits based only on bitumen plus block copolymer with functional group still hold. The polymer should be present in amounts within this range to see an effect and so that the emulsion is not too costly.

The water phase of the emulsion optionally will contain an emulsifier, i.e. from 0.001% to 10% of an emulsifier (surfactant) or mix of emulsifiers and the rest water. If other components are added to the water phase, for example a water soluble thickener, then the above concentration limit based only on emulsifier plus water still holds.

One wants to use low molecular weight emulsifiers at as low a concentration as possible to give stable emulsions because they are expensive and can hurt film properties. There are a variety of surfactants currently available for use in bitumen emulsions which are very effective at concentrations between 0.001% to 2% of the surfactants plus water. However, with the appropriate block copolymers with functional groups it is possible that no additional emulsifier is required, i.e. the block copolymer with functional groups acts as the emulsifier.

These emulsions may generally be used for all of the standard uses for bituminous emulsions. A variety of such uses are described in The Shell Bitumen Handbook edited by D. Whiteoak and published by Shell Bitumen U.K. in the United Kingdom in 1990, which is herein incorporated by reference. Other uses for these emulsions and dispersions include roof coatings, interply adhesives for roofing felts and roll products, paving chip seal binders, paving slurry seal binders, additives in recycled asphalt pavements, binders for cold prepared asphaltic concrete, fiberglass mat binders and the like.

Polymer Emulsions in Bitumen

Polymer emulsions and methods for making them are well known. Generally, such emulsions, or latexes as they are sometimes called, are made by first making a polymer cement comprising a minor proportion of the polymer in a suitable solvent such as cyclohexane. Such polymer cements are often available directly from the polymerization reactor. The polymer cement is emulsified by adding the polymer cement to water which contains at least one emulsifier or surfactant which is present to promote the emulsification. The solvent and the excess water are stripped away, leaving behind a polymer emulsion or latex. Another method of making these emulsions is emulsion polymerization of the polymer. In making the polymer emulsions of the compositions of the present invention, the significant difference is that the polymer is one which contains functional groups which have a strong affinity for water.

Next, the bitumen and the polymer emulsion are mixed together. This may be accomplished by a variety of methods including addition of polymer emulsion to an already formed bitumen emulsion, addition of polymer emulsion to molten bitumen and emulsification of bitumen using the polymer emulsion as the water phase. Addition of polymer emulsion to molten bitumen is preferred because it gives the greatest mixing of polymer and bitumen.

The polymer emulsion will generally contain from about 5% to about 90% of the polymer, from about 0.001% to about 10% of the emulsifier, if it is used, and the balance water. At least this amount of the polymer is necessary because water and emulsifier do not contribute to the final properties of the dried composition but do contribute to cost. Generally no more than 90% is desired because the emulsion becomes too viscous to process. It is preferred that from 40% to 80% be used for the same reasons. The emulsifier should be used in an amount from about 0.001% to about 10% because it is expensive and often hurts or does not contribute to the final properties of the dried composition.

In the final composition, the bitumen plus polymer should comprise 5% to 90% and the water plus surfactant should comprise 10% to 95%. The polymer should comprise 0.005% to 20% of the polymer plus bitumen, and the emulsifier, if used, should comprise 0.001% to 10% of the emulsifier plus water. The reasons are the same as given above for bitumen emulsions.

These polymer or non-asphaltic water based emulsions and dispersions of block copolymers containing functional groups having a strong affinity for water have a variety of uses. Examples include roof coatings, as the water phase for use in emulsifying bitumen, as a blend ingredient with bituminous emulsions, as a modifier for hot mix asphalt concrete in which the emulsion is added to the asphalt in the hot mix plant and as a modifier for bitumen in which the emulsion is added to molten bitumen and the water boiled off.

Emulsifiers

A variety of conventional emulsifiers or surfactants and mixtures of emulsifiers or surfactants can be used to stabilize both the bitumen emulsions and the polymer emulsions. Such surfactants include anionic and non-ionic surfactants and finally divided solids. Surfactant types and specific examples thereof of those that are useful in the present invention include cationics, anionics, nonionics, bentonites and clays. The cationics most widely used are salts of fatty amines, amido amines and imidazolines. The anionics most widely used are salts of fatty acids, rosin acids, lignin sulphonates and the like. Mixtures of such emulsifiers may be used. These surfactants and others useful herein are described in U.S. Pat. No. 1,302,810, U.S. Pat. No. 3,565,842 to Phillips, U.K. patent 1,338,447 to Shell, *Surfactants and Interfacial Phenomena*. edited by M. J. Rosen and published by John Wiley & Sons of New York in 1989, pages 1–32; "The Emulsifying Powers of Bentonite and Allied Clays and of Clays Derived from These by Base Exchange and by Hydrolysis", *Journal of Physical Chemistry.* 34. by R. M. Woodman and E. Taylor, 1930, page 299; and *Asphalt Science and Technology*, by E. J. Barth, published by Gordon and Breech in 1962, all of which are herein incorporated by reference. The preferred emulsifiers depend upon the application. For example, cationics are often used in paving applications because they improve breaking rates and adhesion to aggregate.

Other Components

The polymer and bitumen emulsions of the present invention can be formulated with solvents, oils, fluxes, antioxidants, fillers and other polymers and block polymers prior to forming the water based emulsions or dispersions. They also can be formulated with water soluble thickeners, pigments, pigment dispersing aids, other water based emulsions and dispersions, and the like. The antioxidants can be water soluble and fillers include carbon black and titanium dioxide as well as other commonly used fillers including crushed limestone, talc and fumed silica.

In order to achieve the advantages of the present invention, it is important that the functional groups which are present in the block copolymers be functional groups which possess a strong attraction for water. The functional groups should have a strong attraction for water. In short, they should be water soluble.

One can define a functional group to be a portion of a molecule which contains atom types in addition to hydrogen and carbon. Thus, examples of functional groups are carboxylic acid (—COOH), hydroxyl (—OH), primary amine (—NH$_2$), etc. Low molecular weight molecules with roughly equal amounts by weight of hydrocarbon portion and functional group portion (which possess a strong attraction for water) will exhibit at least some solubility or miscibility with water. Thus, for example, as shown in *The Merck Index* published by Merck & Co., Inc., maleic acid, maleic anhydride, acrylic acid, ethylamine, methanol, etc. are highly soluble or miscible with water. Tertiary butyl methacrylate has a water solubility of 0.05% at 20° C.

Alternatively, the functional group can be defined as the monomer, for example tertiary butyl methacrylate or maleic anhydride, which is added to or inserted into the block copolymer by polymerization or grafting as described above. In this case the functional group which possesses a strong attraction for water will exhibit at least some (non-zero) solubility or miscibility with water.

A strong attraction for water can be obtained, for example, by hydrogen bonding or ionic interaction. Groups capable of hydrogen bonding include acids, amines, hydroxyls and the like. Groups capable of ionic interaction include metal and ammonium salts of acids and salts of amines. Derivatives of functional groups originally placed on the block copolymers also are encompassed within the scope of this invention. One example of such a derivative is the amido alkyl amine derivative of an acid functional group which is obtained by reacting a block copolymer which contains acid groups with a diamine compound of the structure

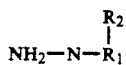

where $R_1$ and $R_2$ are aliphatic, cycloaliphatic, aromatic or alkyl-substituted aromatic hydrocarbon radicals having from 1 to 20 carbon atoms. Further, the original acid containing block copolymer can be converted to a block copolymer with anionic groups by reaction with a base such as sodium hydroxide and can be converted to a block copolymer with cationic groups by first reacting it with a diamine and then with an acid to get the amine salt. Other examples of such derivatives which can be used herein include ester derivatives of an acid functional group obtained by reaction of a block copolymer with acid groups with a compound containing at least one hydroxyl group. The functional group can be modified during formation of the emulsion, for example, an acid-containing polymer at the surface of an emulsion particle can be converted to an acid salt by having a base in the water phase.

EXAMPLE 1

Two block copolymers were used. The first, prior art polymer A, is a selectively hydrogenated, sequentially polymerized, styrene-butadiene-styrene with polystyrene content of 29%, total molecular weight of 52,000 and residual unsaturation less than 2%. The second, polymer B, was prepared by grafting onto polymer A approximately 2% w maleic anhydride. The method has been described in U.S. Pat. No. 4,578,429, which is herein incorporated by reference.

An AC-5 grade asphalt was prepared by blending road flux and propane deasphalted material. Both came from the Shell Deer Park Refinery.

The two polymers were blended at 10%w with the asphalt at 200° C. for 75 minutes with a high shear laboratory Silverson mixer. The surfactant in water solution was prepared with 1.5% w oleic acid and 0.53% w sodium hydroxide in distilled water. The sodium hydroxide was first added to the water. This solution was heated to 50° C., then oleic acid was added dropwise while stirring. The solution was allowed to cool. Thus the surfactant used was sodium oleate (anionic surfactant) with a molar excess of sodium hydroxide.

The asphalt and polymer modified asphalts were heated and controlled at 160° C. and fed to the water plus surfactant solution. The latter was controlled at 90° C. During this process high shear mixing of the water solution was carried out with a laboratory Silverson mixer with emulsion head. This high shear procedure produced asphaltic emulsions. Emulsions were prepared at 10% solids (asphalt or asphalt plus polymer) for study.

The neat asphalt emulsion and polymer A modified asphalt emulsion both separated within twenty-four hours. The neat asphalt emulsion separated by settling while the polymer A modified asphalt emulsion creamed. These observations can be explained by density differences between the phases.

Surprisingly, the polymer B modified asphalt emulsion was still homogeneous to the eye after 1 month. In addition, when thin film were cast from aged reshook (by hand) emulsions, only films from the polymer B modified asphalt emulsion were free of large particles.

It is postulated that the neat AC-5 asphalt particles are sticky enough to flocculate, the polymer A modified AC-5 particles do not have polymer at the surface but surfactant modified asphalt and are thus sticky enough to flocculate, while the polymer B modified AC-5 particles have polymer B at the surface and resist flocculation. Of course slow coalescence rather than flocculation may also be taking place and a method that would find it was not used. It is believed that soft asphalt and low polymer content make coalescence easier.

Thin films (20 mils) of the polymer A and polymer B modified asphalts were cast from reshook (homogeneous to the eye) one month old emulsions and then dried at room temperatures. Polymer A modified asphalt films exhibited poor mechanical properties. They were difficult to remove from release paper without tearing. When tested in tensile testing they yielded at low elongation and then drew down. Their stress at break was negligible. Polymer B modified asphalt films were elastic in that they exhibited elastic recovery. They exhibited a high stress at break. It is postulated that although film coalescence did take place, there is not a great deal of molecular diffusion. Films prepared from polymer A modified asphalt emulsions are coalesced particles which have low molecular weight surfactant but no polymer at the surface. They will thus have properties like asphalt that does not contain polymer. In addition they will likely not be very water resistant. Films prepared from polymer B modified asphalt emulsions are coalesced particles which have polymer modified asphalt at the surface.

EXAMPLE 2

Example 1 was repeated except that a cationic surfactant package was used. 1.5% Jetco AE-12 together with 1% HCl in distilled water was prepared. Jetco AE-12 is a proprietary emulsifier which contains fatty amines and is available from Jetco Chemicals in Corsicana Texas. The Jetco AE-12 was added to a room temperature HCl solution. This mixture was heated to 55° C. and stirred to melt and mix the Jetco AE-12. This water plus surfactant solution stays clear until it is cooled back to room temperature. Upon heating it becomes clear again.

Emulsions were prepared at 10% solids (asphalt plus polymer) using the two polymer modified asphalts from Example 1. The latter were fed at 160° C. to the 85° C. water plus surfactant solution.

Once again the polymer A modified asphalt emulsion creamed rapidly this time within five minutes. The creamed phase was 40% by volume of the total emulsion. Upon cooling to room temperature, additional phases formed and separated into multiple layers. At the bottom of the emulsion a white grainy material could be seen. This is caused because Jetco AE-12 and its chlorine salt are not completely soluble in room temperature water.

Surprisingly, the polymer B modified asphalt cationic emulsion is very stable. It stayed homogeneous for two hours. At two hours a small amount of a dark (presumably asphalt rich) material creamed to the top. This creamed phase was less than 1% by volume of the total emulsion. By 24 hours this creamed material had increased to about 2% by volume of the total emulsion. By 24 hours a light grainy phase, about 4% by volume of the total emulsion, had settled to the bottom of the emulsion. The appearance of the polymer B modified asphalt emulsion did not change after 24 hours.

Thin films (20 mils) of the polymer A and polymer B modified asphalts were cast from reshook (by hand., homogeneous to the eye) emulsions which had aged for more than 24 hours, and then dried at room temperature. Polymer A modified asphalt films exhibited poor mechanical properties. They broke at extremely low elongation. Polymer B modified asphalt films exhibited high elongation, elastic recovery and strength.

EXAMPLE 3

Example 2 was repeated except that emulsions were prepared at 50% solids (asphalt plus polymer). The polymer A modified asphalt emulsion was very poor in quality in that it was lumpy and not homogeneous. Roughly 30% of it was retained on a 10 mesh screen (very large mesh size). Clearly, this emulsion contained a large amount of polymer modified asphalt that was not emulsified. Surprisingly, the polymer B modified asphalt emulsion was smooth and homogeneous and passed easily through a 10 mesh screen.

I claim:

1. A bitumen emulsion comprising
   (a) bitumen,
   (b) water,
   (c) optionally at least one emulsifier, and
   (d) a conjugated diene polymer containing functional groups which have a strong affinity for water wherein the polymer is a block copolymer which is comprised of at least one conjugated diene block and at least one acrylic monomer block.

2. The emulsion of claim 1 wherein the bitumen plus polymer comprises 5% to 90% by weight of the total emulsion, the water plus surfactant comprises 10-95% by weight of the total emulsion, the polymer comprises 0.005% to 20% by weight of the polymer plus bitumen and the emulsifier comprises 0.001% to 10% by weight of the emulsifier plus water.

3. The emulsion of claim 2 wherein the block copolymer contains from about 0.5% to about 50% by weight of the polymer of said functional groups.

4. The emulsion of claim 3 wherein the acrylic monomer block is a block of tertiary butyl methacrylate.

5. The emulsion of claim 3 wherein the acrylic monomer block is a complete or partial acid, salt or anhydride derivative of a block of tertiary butyl methacrylate.

6. A bituminous composition comprising
   (a) bitumen, and
   (b) a polymer emulsion comprising
      (i) water,
      (ii) optionally, at least one emulsifier, and
      (iii) a conjugated diene polymer containing functional groups which have a strong affinity for water wherein the polymer is a block copolymer which is comprised of at least one conjugated diene block and at least one acrylic monomer block.

7. The composition of claim 6 wherein the bitumen plus polymer comprises 5% to 90% by weight of the total compensation, the water plus surfactant comprises 10% to 95% by weight of the total compensation, the polymer comprises 0.005% to 20% by weight of the polymer plus bitumen and the emulsifier comprises 0.001% to 10% by weight of the emulsifier plus water.

8. The bituminous composition of claim 7 wherein the block copolymer contains from about 0.5% to about 50% by weight of the polymer of said functional groups.

9. The bituminous composition of claim 8 wherein the acrylic monomer block is a block of tertiary butyl methacrylate.

10. The bituminous composition of claim 8 wherein the acrylic monomer block is a complete or partial acid, salt or anhydride derivative of a block of tertiary butyl methacrylate.

11. The bituminous emulsion of claim 1 wherein the emulsifiers are selected from the group consisting of cationics, anionics, nonionics, bentonites and clays.

12. The bituminous composition of claim 6 wherein the emulsifiers are selected from the group consisting of cationics, anionics, nonionics, bentonites and clays.

* * * * *